United States Patent

[11] 3,586,127

[72] Inventor Robert H. Jones
65 Livingston Road, Apt., Guildwood Village, Scarborough, Ontario, Canada
[21] Appl. No. 796,313
[22] Filed Jan. 31, 1969
[45] Patented June 22, 1971
[32] Priority Feb. 3, 1968
[33] Great Britain
[31] 5583/68

[54] STACK-CLIMBING SYSTEMS
9 Claims, 6 Drawing Figs.
[52] U.S. Cl. .................................................. 182/133,
182/187, 187/1, 187/17, 187/95
[51] Int. Cl. ........................................................ A63b 27/00
[50] Field of Search ........................................... 187/1, 17,
70, 95, 27; 182/133, 187

[56] References Cited
UNITED STATES PATENTS
2,541,767  2/1951  Jones ............................ 182/133
2,654,638  10/1953  Elliott ........................... 182/133
2,727,335  12/1955  Susil ............................. 182/133
3,237,720  3/1966  Landquist ....................... 182/133

Primary Examiner—Harvey C. Hornsby
Attorney—Holman & Stern

ABSTRACT: A stack-climbing system in which a pair of electrically propelled, pneumatically tired load-carrying vehicles is adapted to be held in diametrical opposition upon the circumference of a stack under the influence of tension maintained by steel cables encompassing the stack, extending between the diametrically opposite vehicles to a pair of idler bogies also in diametrical opposition and spaced from the vehicles so that the cables are at all times spaced from the stack.

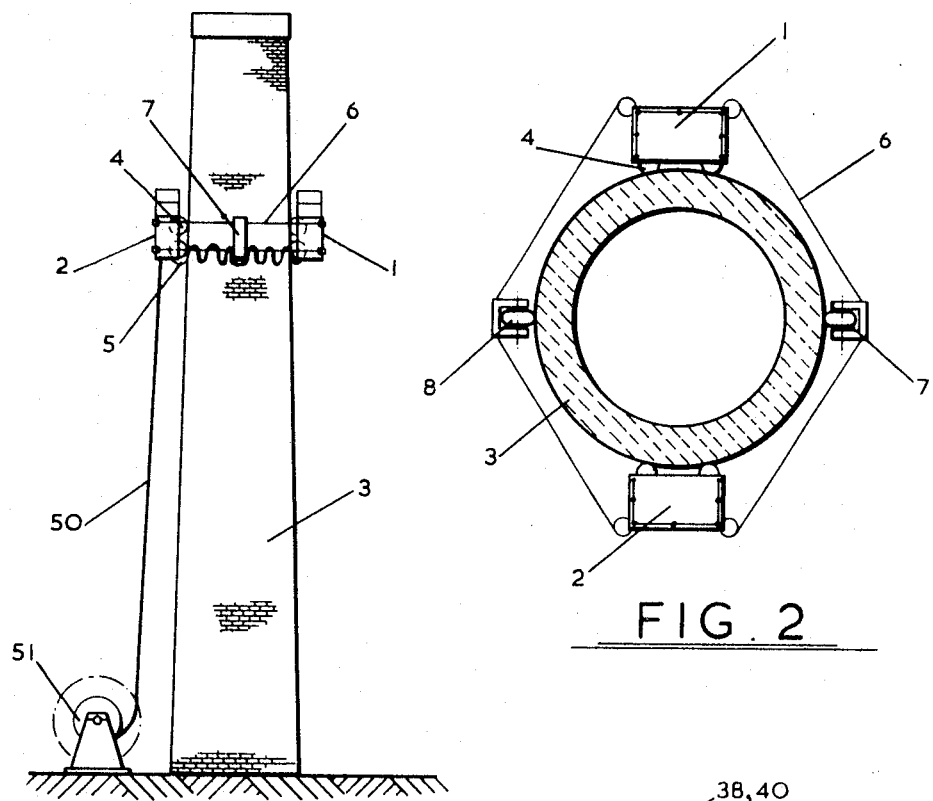
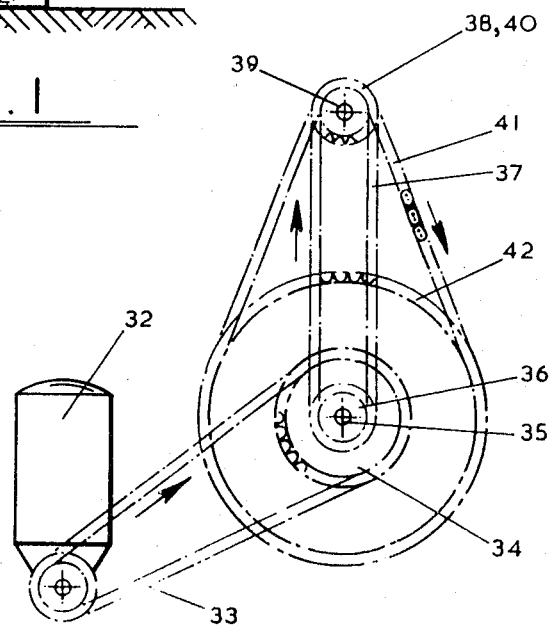
FIG. 1
FIG. 2
FIG. 4

STACK-CLIMBING SYSTEMS

BACKGROUND OF THE INVENTION

The present invention relates to a stack-climbing system for ascending and descending tall slender structures and particularly tapering structures such as industrial chimney stacks and the like. Although primarily designed for tapered stacks, by virtue of the very high coefficient of friction developed, and with tires designed specifically for the purpose, purely cylindrical industrial towers might be ascended such as petroleum fractionating towers and the like.

A stack may be erected from the ground up by the use of the system according to the invention and without the necessity for the usual ancillary construction equipment such as cranes, hoists, false work and the like.

SUMMARY OF THE INVENTION

The present system comprises a pair of electrically propelled, pneumatically tired load-carrying vehicles adapted to be held in diametrical opposition upon the circumference of a stack under the influence of tension maintained by steel cables encompassing the stack, extending between the diametrically opposite vehicles to a pair of idler bogies also in diametrical opposition and spaced from the vehicles so that the cables are at all times spaced from the stack.

Each of the two load-carrying vehicles, the master and the slave, may be provided with two electric motors, one for applying the necessary climbing traction and mechanically coupled to one or both of two axles carrying pneumatically tired wheels, and the other geared and mechanically coupled to winches located on each vehicle for tensioning the cables.

Under operating conditions, both the traction motors will be connected in parallel, and likewise the cable tensioning motors. As a result, the vehicles will ascend and descend together while the winches operate simultaneously.

Referring to the accompanying drawings:

BRIEF DESCRIPTION OF THE DRAWINGS

FIG. 1 is a diagrammatic view showing a system in accordance with the invention in position on a stack, FIG. 2 is a diagrammatic plan view, FIG. 4 is a diagram showing the means for driving the winches.

DETAILED DESCRIPTION OF THE INVENTION

Figure 3:
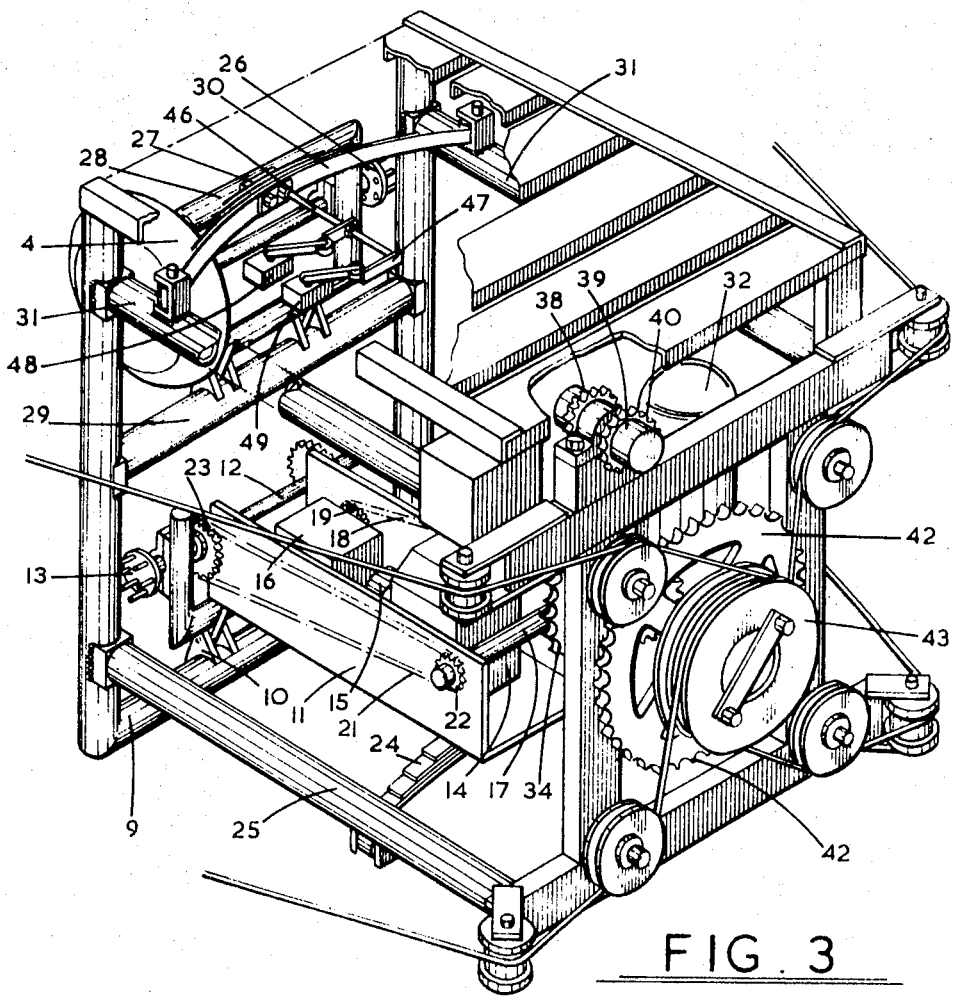
FIG. 3 is a perspective view of one of the vehicles.

As shown in FIGS. 1 and 2, the system comprises two vehicles 1, 2 arranged diametrically opposite to one another on a stack 3 with such vehicles being fitted with wheels 4, 5 which roll on the surface of the stack, and held in position by cables 6, attached to idlers 7 which are also diametrically opposed and run on wheels 8 on the surface of the stack. Each of the vehicles 1 and 2 is capable of supporting a load, and each has means for driving the wheels 4, 5 and for tensioning the cables 6.

Figure 5:
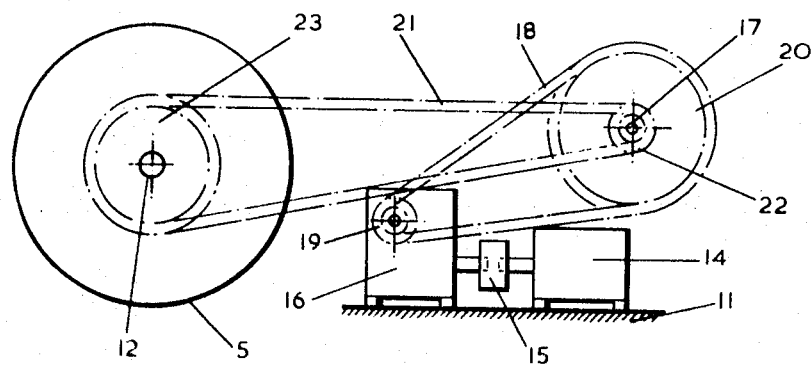
FIG. 5 shows diagrammatically the drive to the climbing wheels.

As shown in FIG. 3, each of the vehicles has a tubular steel frame. To a lower frame member 9 there is hinged, by means of flanges 10, a subframe 11 which carries a shaft 12 having at each end a hub 13 for a tired wheel 5 (omitted in FIG. 3 for the sake of clearness). The subframe 11 also carries a driving motor 14, magnetic brake and coupling 15, worm gearbox 16 and lay shaft 17. The drive is, as shown in FIG. 5, by chain 18 from a gearbox sprocket 19 to a sprocket 120 on shaft 17, and by two chains 21 from sprockets 22 on shaft 17 to sprockets 23 on the wheel shaft 12. The subframe 11 is supported by a leaf spring 24 attached to frame members 25.

The upper tired wheels 4 are mounted on hubs 26 on a shaft 27 carried by a subframe 28 which is hinged to a frame member 29 and is attached to a leaf spring 30 capable of yielding in a horizontal direction and supported at its ends on upper frame members 31.

The frame carries also the winch-driving means shown in FIG. 4. This comprises a motorized worm reduction unit 32 which drives, through a chain 33, a sprocket 34 which turns on a fixed shaft 35 together with a sprocket 36. A chain 37 drives a sprocket 38 fixed on a shaft 39, on which is also fixed a sprocket 40 from which a chain 41 drives a sprocket 42 attached to a winch drum 43. The drum 43 winds up four cables 44 which pass around pulleys 45 to rollers 46 and thence to the idlers 7. The four pulleys 45 are located in different planes to allow the cables to run smoothly to the drum 43 for tensioning the cables to hold the two vehicles firmly against the stack.

One of the vehicles, a bracket fixing the leaf spring 30 to the subframe 28 carries a rod 46 provided with two adjustable strikers 47 for operating switches 48, 49 to control the tensioning winch 43. If more tension is needed, the spring 30 pushes the rod 46 outwards and the switch 48 is actuated. When the tension becomes adequate, the rod 46 is pushed inwards and the switch 49 is actuated. Due to the high-reduction ratio in the drive to the winch drum 43, including the worm gear 32, it is not necessary to provide any brake to prevent back drive.

Electric power for operating the system is provided by a flexible cable 50 equipped with a takeup reel 51. Each vehicle has a flat loading surface 52, and a control panel (not shown) can be mounted on one of the vehicles, or if preferred, there may be a control station on the ground, in which case, a flexible control cable containing connections to switches and so on will be required between the ground stations and the movable vehicles.

Figure 6:
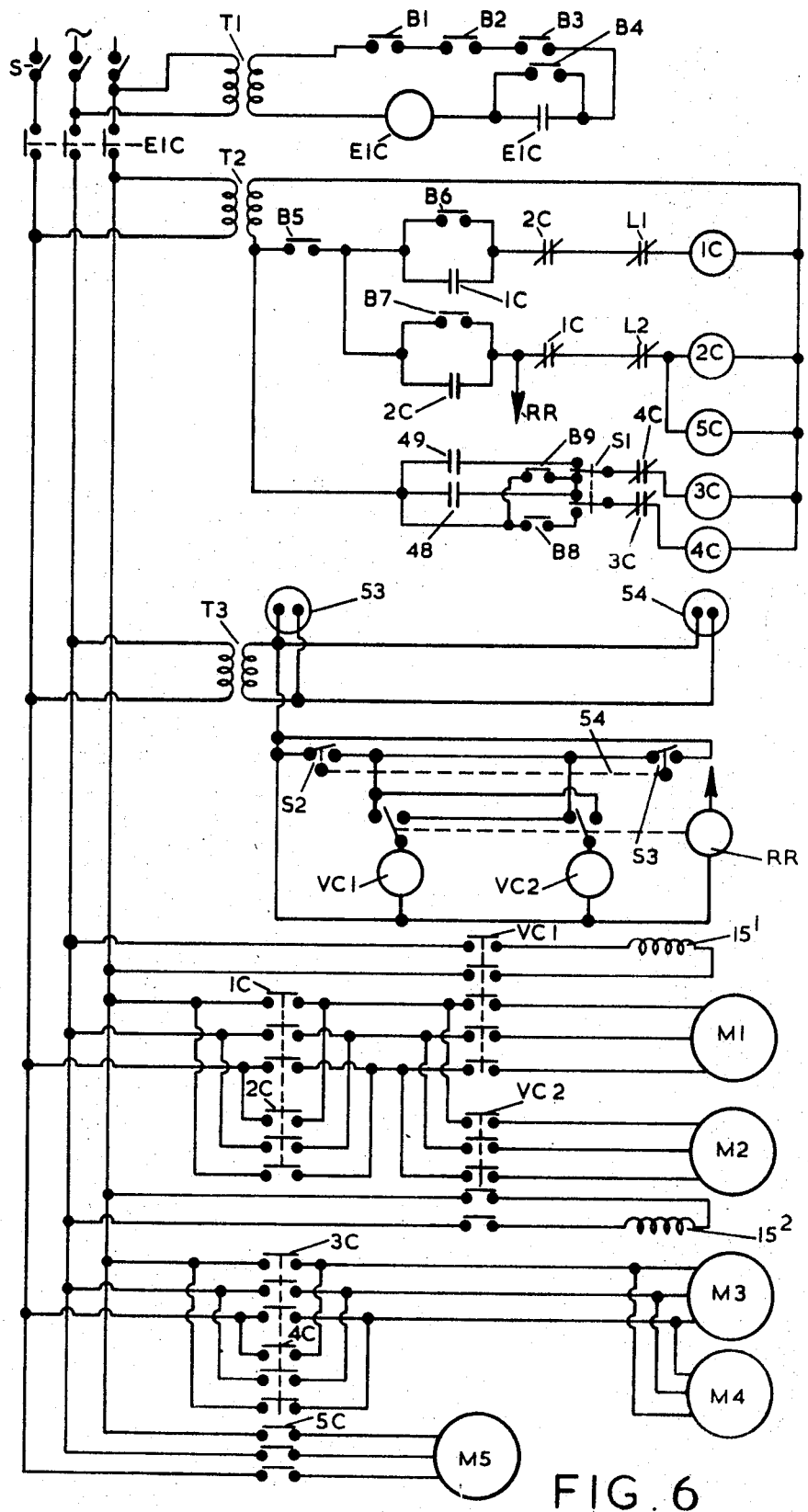
FIG. 6 is an electric circuit diagram.

A suitable electrical control circuit is shown by way of example in FIG. 6.

Three-phase alternating current is supplied from a suitable source through a main switch S. A transformer T1 supplies an isolating contactor coil E1C by way of three emergency stop push buttons B1, B2 and B3, one on the ground and one on each vehicle, in series with a power-on push button B4 with a holding contact in parallel.

The contactor E1C closes the circuit to the remainder of the equipment. A transformer T2 supplies the coils of contactors 1C, 2C, 3C, 4C and 5C. A normally closed stop button B5 supplies power by way of "up" pushbutton B6 with holding contact 1C, normally closed contact 2C and normally closed limit switch L1 to coil 1C, or by way of "down" push button B7 with holding contact 2C, normally closed contact 1C and normally closed limit switch L2 to coils 2C and 5C, and also by way of B7 and 2C, a relay RR.

Transformer T2 also supplies by way of switches 48, 49 (shown also in FIG. 3) coils 3C, 4C. There is a key switch S1 which provides automatic operation in the position shown, and in its changed over position provides for manual operation by means of pushbuttons B8, B9 to energize respectively the coil 4C for starting motors M3, M4 for driving the tensioning winches 43 or the coil 3C for releasing the tension. Normally closed interlock contacts 3C and 4C are provided in series with the coils 4C and 3C respectively.

Transformer T3 supplies current to socket outlets 53 and 54 provided on the two vehicles, and to two float switches 52, 53 which are provided one on each vehicles at similar levels and which are interconnected by a hydraulic connection 54 so that if one vehicle rises above the other, fluid flows to the float switch on the lower vehicle, and opens the switch on the upper vehicle, thereby deenergizing one of two contactor coils VC1, VC2. These coils are fed through the contacts of the relay RR referred to above, and when the relay is energized through the "down" pushbutton B7 the contacts change over the connections between the switches S2, S3 and coils VC1 and VC2.

The drive motors for the two vehicles, shown at 14 in FIG. 3, are shown at M1 and M2 in FIG. 6. The two motors are supplied by contactor 1C for climbing or by contactor 2C for descending, controlled as described above by the push buttons B6, B7. The motor M1 and also corresponding magnetic brake coil 15¹ are fed through the contactor VC2. Therefore, if for example, the float switch S2 opens because its vehicle has climbed to a higher level, the contactor VC1 is deenergized, the motor M1 stops and the brake 15¹ is applied. During descent, the relay RR is energized and the opening of e.g. the float switch S2 deenergizes the contactor VC2 to stop the vehicle which has descended to a lower level.

Each of the contactors 3C, 4C supplies current to both of the winch drum motors M3, M4 (shown at 32 in (FIGS. 3 and 4), for releasing and increasing the tension respectively.

The contactor 5C supplies current to a motor M5 for driving the cable reel 51, but in some cases this motor and contactor may be eliminated.

The limit switches L1 and L2 are provided to avoid overrunning upwards and downwards respectively. The switch L1 could be operated by an arm extending upwards from a vehicle and having a wheel running on the stack wall, adapted to open the switch if the wheel should run off the top of the wall. The switch L2 could be actuated by a wire hanging down from the vehicle and carrying a weight, with the switch being opened if the weight should touch the ground.

It will be understood that the details of the electric circuits may by varied to suit particular requirements, and that fuses, overload relays and additional start or stop switches may be incorporated where needed.

In a modification of the invention, the wheels 8 of the idler bogies 7 may be driven by means of electric motors incorporated in the bogies with appropriate reduction gearing, with the motors being supplied with current through the contactors 1C or 2C.

What I claim is:

1. A stack-climbing system including two separate load-carrying vehicles, pneumatically tired wheels arranged at one side of each vehicle, two separate idler bogies, a wheel at one side of each bogie, cables attached to the idler bogies, tensioning means on the vehicles for tensioning the cables when the vehicles and bogies are disposed around a stack with the vehicles diametrically opposed and the bogies diametrically opposed and the wheels of the vehicles and bogies being in contact with the surface of the stack for travel upwardly and downwardly on said surface, two electric motors on each vehicle, means operably connecting one motor to the wheels of the vehicle for driving the wheels and means operably connecting the other motor with the tensioning means for driving the tensioning means to maintain the wheels of the vehicles and idler bogies in engagement with the stack surface.

2. A stack-climbing system as claimed in claim 1, in which the means operably connecting the electric motor to the wheels of the vehicle and the tensioning means respectively include worm reduction gears.

3. A stack-climbing system as claimed in claim 1, in which each vehicle includes a frame, a subframe hinged in said frame, and said subframe carrying the electric motor, and at least one pair of tired wheels.

4. A stack-climbing system as claimed in claim 3, including a subframe carrying the upper pair of tired wheels, spring means operably related to said subframe for urging said wheels toward the stack surface, electrical switch means controlling the motors for driving the tensioning means and said switch means being actuated by said subframe.

5. A stack-climbing system as claimed in claim 1 in which each vehicle is provided with a winch drum on which four cables are wound, guide rollers at the top of the vehicle over which two of the cables pass to the two idler bogies, and guide rollers at the bottom of the vehicle over which the other two cables pass to the idler bogies.

6. A stack-climbing system as claimed in claim 1 including an electrical supply, the electric motors of the two vehicles for driving the tensioning means being connected in parallel to the electrical supply through reversing contactors and being arranged to operate in unison.

7. A stack-climing system as claimed in claim 1 including an electrical supply, and the electric motor of the two vehicles driving the wheels of the vehicles being connected in parallel to the electrical supply through reversing contactors and being arranged to operate in unison.

8. A stack-climbing system as claimed in claim 7, in which each vehicle is provided with a float chamber, a float switch in the float chamber adapted to open when liquid is withdrawn from the chamber, a hydraulic duct connecting the two float chambers so that if one vehicle is at a greater height than the other vehicle, liquid flows out of its float chamber thus allowing the float switch to open and the float switches being connected to operate contactors in the motor circuits to bring the vehicles to the same level.

9. A stack-climbing system as claimed in claim 8, in which during ascent, the float switch of the vehicle controls an electric motor driving the wheels of the vehicle, but in descent, a relay changes over the connections of the float switches so that the float switch of a vehicle controls the electric motor for guiding the wheels of the other vehicle.